United States Patent
Frese et al.

(10) Patent No.: US 12,061,151 B2
(45) Date of Patent: Aug. 13, 2024

(54) METHOD, DEVICE AND SYSTEM FOR DETECTING RAMAN SCATTERED LIGHT

(71) Applicant: Fraunhofer-Gesellschaft zur Förderung der Angewandten Forschung E.V., Munich (DE)

(72) Inventors: Ines Frese, Mainz (DE); Michael Maskos, Bodenheim (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 150 days.

(21) Appl. No.: 17/613,234

(22) PCT Filed: May 27, 2020

(86) PCT No.: PCT/EP2020/064657
§ 371 (c)(1),
(2) Date: Nov. 22, 2021

(87) PCT Pub. No.: WO2020/239814
PCT Pub. Date: Dec. 3, 2020

(65) Prior Publication Data
US 2022/0214281 A1    Jul. 7, 2022

(30) Foreign Application Priority Data
May 28, 2019 (DE) ................. 10 2019 114 252.0

(51) Int. Cl.
*G01N 21/65* (2006.01)

(52) U.S. Cl.
CPC ... *G01N 21/65* (2013.01); *G01N 2201/06113* (2013.01); *G01N 2201/0633* (2013.01); *G01N 2201/129* (2013.01)

(58) Field of Classification Search
CPC ......... G01N 21/65; G01N 2201/06113; G01N 2201/0633; G01N 2201/129
See application file for complete search history.

(56) References Cited

U.S. PATENT DOCUMENTS

| 4,176,916 A | 12/1979 | Carpenter |
| 4,648,714 A * | 3/1987 | Benner ................. H01S 3/1086 356/418 |

(Continued)

FOREIGN PATENT DOCUMENTS

| AU | 2607888 B | 5/1989 |
| CN | 103245654 A | 8/2013 |

(Continued)

OTHER PUBLICATIONS

Rozas, G., Fabry-Perot-multichannel spectrometer tandem for ultra-high resolution Raman spectroscopy, Review of Scientific Instruments, Jan. 15, 2014, pp. 013103-1 to 013103-09, vol. 85, AIP Publishing LLC.

(Continued)

*Primary Examiner* — Dominic J Bologna
*Assistant Examiner* — Huy Phillip Pham
(74) *Attorney, Agent, or Firm* — Hudak, Shunk & Farine Co. LPA (57) ABSTRACT

A method for detecting Raman scattered light using at least one interference filter and a detection unit, the Raman scattered light to be detected including an incoming scattered light signal, wherein the method includes the following steps: * a first filtered scattered light signal is generated by the application of a first transmission function to the incoming scattered light signal, the first transmission function being assigned to a first optical path length $L_1$ through a first interference filter, and the first transmission function defining a first spectral band $\delta\lambda_1$; * a second filtered scattered light signal is generated by the application of a second (Continued)

transmission function to the incoming scattered light signal, the second transmission function being assigned to a second optical path length $L_2 \neq L_1$ through the first interference filter or through a second interference filter, and second transmission function defining a second spectral band $\delta\lambda_2$; and * the first and the second filtered scattered light signals are detected by the detection unit.

11 Claims, 4 Drawing Sheets

(56) References Cited

U.S. PATENT DOCUMENTS

| | | | |
|---|---|---|---|
| 4,784,486 A | | 11/1988 | Van Wagenen et al. |
| 5,194,912 A | * | 3/1993 | Batchelder ........... G02B 21/008 356/301 |
| 2007/0024979 A1 | * | 2/2007 | Lissotschenko ..... G02B 3/0025 359/619 |
| 2008/0030728 A1 | | 2/2008 | Nguyen |
| 2017/0176338 A1 | * | 6/2017 | Wu ..................... G01N 21/6428 |
| 2018/0045651 A1 | | 2/2018 | Jin et al. |
| 2018/0275064 A1 | | 9/2018 | Li et al. |
| 2019/0154584 A1 | | 5/2019 | Ahn et al. |

FOREIGN PATENT DOCUMENTS

| | | |
|---|---|---|
| CN | 107014803 A | 8/2017 |
| CN | 206557102 U | 10/2017 |
| CN | 107462566 A | 12/2017 |
| DE | 102004061728 A1 | 6/2006 |
| JP | 201848825 A | 3/2018 |

OTHER PUBLICATIONS

Jin, P., Research on Key Components of Gas Raman Spectrometer Based on Cavity Enhancement, Dissertation submitted to Hangzhou Dianzi University for the Degree of Master, Mar. 19, 2018, p. 1-73, China Academic Journal Electronic Publishing House.

First Office Action for corresponding Chinese Application 202080038911.7, issued May 24, 2023 by the National Intellectual Property Administration of the People's Republic of China.

Cooper, J.; Chemometric analysis of Raman spectroscopic data for process control applications, Chemometrics and Intelligent Lab. Systems, 1999, pp. 231-247, vol. 46, Elsevier Science B.V.

Gebrekidan, M., et al.; A shifted-excitation Raman difference spectroscopy (SERDS) evaluation strategy for the efficient isolation of Raman spectra from extreme fluorencence interference; J. Raman Spectroscopy, 2015, pp. 198-209, vol. 47, John Wiley & Sons Ltd.

Ivleva, N.,et al.; Microplastic in Aquatic Ecosystems, Angewandte Chem. Int. Ed., 2017, pp. 1720-1739, vol. 56, Wiley-VCH Verlag Gmbh & Co. KGaA.

McCreery, R., Nondispersive Raman Spectrometers, Raman Spectroscopy for Chemical Analysis, 2000, pp. 221-249, John Wiley & Sons, Inc.

Chinese decision to grant and a Supplemental Search Report dated Jan. 6, 2024 for family member Application No. CN2020800389117.

* cited by examiner

METHOD, DEVICE AND SYSTEM FOR DETECTING RAMAN SCATTERED LIGHT

FIELD OF THE INVENTION

The invention relates to a method, a device and a system for detecting Raman scattered light.

BACKGROUND OF THE INVENTION

Raman spectroscopy is one of the most important methods of non-invasive and rapid procedures for material determination today. A Raman spectrometer is usually used, which has a very high spectral resolution and enables the material to be determined on the basis of the characteristic Raman shifts.

Raman spectroscopy is based on the Raman effect: a non-elastic light scattering. In non-elastic light scattering, a molecule is polarized by excitation light. This gives the molecule additional energy which is significantly less than the energy of the excitation of higher electron states and which is very short-lived and which is made up of a quantum mechanical superposition of all states involved.

For Raman spectroscopy, the wavelength of the excitation light does not have to correspond to the material-specific absorption bands of the object to be examined. This means that the wavelength can be selected in any desired spectral range. Typically, light sources with wavelengths of 365 nm, 405 nm, 546 nm, 670 nm, 783 nm or 1064 nm are used as excitation light.

The Raman-scattered light has a material-specific spectral shift in relation to the wavelength of the excitation light, which corresponds to the characteristic energies of rotation, oscillation, phonon or spin-flip processes. This leads to very small changes in wavelength and accordingly requires a high spectral resolution in the detection devices.

The devices are commercially available in the price range between €60,000 and €500,000, contain high quality and expensive optical components and, apart from cheaper handheld or portable devices, require a laboratory environment with highly qualified operating personnel. With the most modern equipment and using a 785 nm excitation beam, a spectral resolution of approx. 0.1 nm can be achieved. The usual values for the spectral resolution of laboratory devices range from approx. 0.3 nm at an excitation wavelength of $\lambda_{exc}$=546 nm to 1.1 nm at $\lambda_{exc}$=1064 nm.

In contrast, cheaper handheld devices are disadvantageous because they pay for their smaller design and cheaper components by sacrificing spectral resolution and sensitivity.

The spectrally resolved measurement signal is mostly detected by means of a CCD sensor. The optical sensitivity of the CCD sensor is the limiting factor for the sensitivity of a Raman spectrometer. The technical complexity of spectrometers that use CCD sensors grows with the number of individual detectors (meaning the number of individual pixels of the sensor), since each individual detector is electronically amplified. Accordingly, not only is there a greater need for trained personnel and stricter requirements for the environment for operating said spectrometers, but the corresponding devices become more expensive. This effect is particularly restrictive when it comes to relatively fast dynamic measurements on colloidal or highly diluted liquid samples and especially in the flow. In this case, the elastic scattering on the colloid particles and additional refractive effects at the boundaries between media with different refractive indices impair the signal yield from the samples or the sample container. A particularly high sensitivity without the possibility of a longer integration time is required for such samples.

Ivleva et al. (N. P. Ivleva, A. C. Wiesheu, & R. Niessner (2017), Microplastic in aquatic ecosystems, Angewandte Chemie International Edition, 56 (7), 1720-1739) describes the experiment using an m-Raman spectrometer, meaning with image analysis and Raman measurement of individual colloidal particles to expand the fields of application of conventional measuring methods to the environmental problem with microplastics. The physical limitations of imaging (such as the diffraction limit or the limited mechanical resolution of microscopic shifting tables) place restrictions on this method, however. Due to their complexity, m-Raman spectrometers require a laboratory environment and appropriate experience to operate. Furthermore, devices of this type are associated with high costs.

An additional problem of the increase in sensitivity is that the possibilities of further signal amplification and an increase in the signal-to-noise ratio in the current high-quality, cooled CCD sensors have already been largely exhausted. This is partly due to the number of individual pixels and the physical limits of the materials used.

The only type of non-dispersive Raman detector that has been implemented to date is the FT-Raman spectrometer. Instead of a dispersive element such as a grating, this uses a spectrally tunable filter (such as a Fabry-Perot filter) for the spectral splitting of the Raman signal (cf Nondispersive Raman Spectrometers, in "Raman Spectroscopy for Chemical Analysis" 2005). The excitation light is then superimposed on the Raman signal, and the interferogram that forms during the superimposition is recorded by an individual or an array of individual detectors. However, the aforementioned disadvantages of expensive optical components and the need for a laboratory environment apply to such a device.

The idea of developing a non-dispersive Raman detector based on conventional interference filters is already known, but has not yet gained acceptance due to a particularly tough requirement for the spectral resolution (width of the transmission function). When using an interference filter with a transmission range that is wider than the line to be detected, the intensity to be detected is registered by a detector averaged together with the background within the transmission range of the filter, which reduces the detection of the overall signal.

SUMMARY OF THE INVENTION

The aim of the invention is an improved non-dispersive method for the detection of Raman scattered light. Compared to the state of the art, the improvement includes the ability to use an easier to handle and transportable device without sacrificing resolution and sensitivity, which can also be used independently of an expensive and complex laboratory environment.

That aim is achieved by a method for detecting Raman scattered light using at least one interference filter and a detection unit, said Raman scattered light to be detected comprising an incoming scattered light signal, wherein the method comprises the following steps: generating a first filtered scattered light signal by applying a first transmission function to the incoming scattered light signal, the first transmission function being assigned to a first optical path length $L_1$ through a first interference filter, the first transmission function defining a first spectral band $\delta\lambda_1$, the first spectral band $\delta\lambda_1$ comprising light with first wavelengths around a first mean wavelength $\lambda_1$, the light of the first wavelengths being transmitted through the first interference filter, generating a second filtered scattered light signal by applying a second transmission function to the incoming scattered light signal, the second transmission function being assigned to a second optical path length $L_2 \neq L_1$ through the first interference filter or through a second interference filter, the second transmission function defining a second spectral band $\delta\lambda_2$, the second spectral band $\delta\lambda_2$ comprising light with second wavelengths around a second mean wavelength $\lambda_2$, the second mean wavelength $\lambda_2$ being shifted by a wavelength compared to the first mean wavelength $\Delta\lambda_2$, the light of the second wavelengths being transmitted through the first interference filter or through the second interference filter, and detecting the first and the second filtered scattered light signal with the detection unit.

The terms "scattered light" and "scattered light signal" are used herein. They describe the same thing—photons that are emitted by the sample to be examined. "Scattered light" describes the physical wave or beam character: the ability to be bent and refracted or to interfere. "Scattered light signal," on the other hand, describes the mathematical character: the ability to apply methods of signal processing and, in particular, the ability to be transformed, integrated, folded or correlated. The terms "light" and "signal" are used synonymously in the context of this invention.

In a first aspect, the invention relates to a method for detecting Raman scattered light using at least one interference filter and a detection unit, the Raman scattered light to be detected comprising an incoming scattered light signal. The procedure consists of the following steps:

Generating a first filtered scattered light signal by applying a first transmission function to the incoming scattered light signal, the first transmission function being assigned to a first optical path length $L_1$ through a first interference filter, the first transmission function defining a first spectral band $\delta\lambda_1$, the first spectral band $\delta\lambda_1$ comprising light with first wavelengths around a first mean wavelength $\lambda_1$, the light of the first wavelengths being transmitted through the first interference filter;

Generating a second filtered scattered light signal by applying a second transmission function to the incoming scattered light signal, the second transmission function being assigned to a second optical path length $L_2 \neq L_1$ through the first interference filter or through a second interference filter, the second transmission function defining a second spectral band $\delta\lambda_2$, the second spectral band $\delta\lambda_2$ comprising light with second wavelengths around a second mean wavelength $\lambda_2$, the second mean wavelength $\lambda_2$ being shifted from the first mean wavelength $\lambda_1$ by a wavelength $\Delta\lambda_2$, the light of the second wavelengths passing through the first interference filter or through the second interference filter;

Detecting the first and the second filtered scattered light signal by the detection unit.

A Raman device can be used for the method, which by means of a light source, in particular a laser, excites particles in a sample to emit Raman scattered light. Both the emitted Raman scattered light and the excitation light can be deflected and/or guided by optical components. To carry out the method according to the invention, only the Raman scattered light is required, which, in contrast to the elastic Rayleigh scattering, is angle-independent and has a homogeneous scattering intensity over the entire solid angle.

The at least one interference filter is preferably a narrowband interference filter, the at least one interference filter being a bandpass filter with a spectral width between 0.5 nm and 4 nm, in particular between 1.5 nm and 2 nm and preferably 2 nm, in the visual and/or near infrared spectrum. The spectral width of an interference filter is determined by the spectral band $\delta\lambda$, which is defined by a transmission function which is assigned to an optical path length L through the interference filter in question. The physical character and the mathematical character of both the light and the at least one interference filter are therefore closely linked to one another.

The phrase "at least one interference filter" can mean both a single first interference filter and a plurality of interference filters. If a plurality of interference filters are used for the process, then some of the several interference filters are designated as "first interference filter," "second interference filter," etc.

An interference filter can consist, for example, of a substrate layer, preferably made of glass or quartz glass, which is plane-parallel and coated on one or both sides. The coating(s) can, for example, comprise several layers of different, alternately applied materials and are only transparent for the spectral band d1. Together with the substrate, all coatings form a Fabry-Perot filter with a preferably quasi-rectangular transmission function.

An interference filter therefore filters light with certain wavelengths through constructive and destructive interference. Which wavelengths are filtered by the interference filter depends on the optical path length L of the light through the at least one interference filter. The optical path length L is the sum of the optical path lengths $L_j$ of the individual layers j, each optical path length $L_j$ being the product of the refractive index $n_j$ of the material of the respective layers j and the actual lengths $l_j$ of the path of the light through the layer j. The optical path length L is thus defined as:

$$L = \Sigma_j n_j * l_j.$$

The lengths $l_j$ depend on the geometric configuration of the at least one interference filter or its layers. Each layer j preferably has a thickness $d_j$, wherein the layers j can be of different thicknesses or the thicknesses $d_j$ can be different. If the layers of the at least one interference filter are flat, the lengths $l_j$ are determined using the thicknesses $d_j$, the refractive indices $n_j$, $n_{j-1}$ and the angle of incidence $\alpha_j$ of the Raman scattered light on the corresponding layer j, wherein the refractive index $n_{j-1}$ is the refractive index of the medium upstream of the respective layer j. In the case of the first layer, the medium upstream of the respective layer j is usually air with a refractive index of almost 1. In the case of all other layers, the refractive index $n_{j-1}$ is the refractive index of the respective upstream layer j-1. The angles of incidence $\alpha_j$ are always determined relative to the perpendicular of the entrance surface of the Raman scattered light into the corresponding layer j. The following applies to the length $l_j$:

$$l_j = \frac{d_j}{\cos\left(\sin^{-1}\left(\frac{n_{j-1}}{n_j}\sin\alpha_j\right)\right)}$$

where, according to Snell's law of refraction, $$\sin^{-1}\left(\frac{n_{j-1}}{n_j}\sin\alpha_j\right)$$

describes the angle of the beam path relative to the perpendicular through the respective layer j.

For simplicity's sake, the at least one interference filter is described below as an optical component with a (total) length l and a (total) thickness d, on which the Raman scattered light strikes with the angle of incidence $\alpha$. The optical path length L thus depends on the thickness d of the at least one interference filter, the angle of incidence $\alpha$ of the Raman scattered light on the at least one interference filter and the refractive indices $n_j$ of the layer materials.

In terms of signal processing, each optical path length L is assigned to a transmission function. For example, a first transmission function is assigned to a first optical path length $L_1$, a second transmission function is assigned to a second optical path length $L_2$, etc. The assignments of transmission functions and optical path lengths $L_i$ are bijective, that is, they are unambiguous and reversible.

A transmission function defines a spectral band $\delta\lambda$ for light with specific wavelengths that is transmitted along the optical path length L through one of the at least one interference filters. The spectral band $\delta\lambda$ defined by a transmission function is arranged around a mean wavelength $\lambda_0$ and is limited at the top by an upper limit $\delta\lambda^+$ and at the bottom by a lower limit $\delta\lambda^-$. The following applies:

$$\delta\lambda = \delta\lambda^+ - \delta\lambda^-;$$

The upper limit $\delta\lambda^+$ and the lower limit $\delta\lambda^-$ can be arranged symmetrically or asymmetrically around the mean wavelength $\lambda_0$. For example, the arithmetic mean, the mode, the median or a weighted mean of the transmitted wave spectrum can be used as the mean wavelength $\lambda_0$. It is crucial that the mean value for all transmission functions be determined in the same way. In connection with rectangular transmission functions, the mean wavelength $\lambda_0$ is also referred to in practice as the "central wavelength" of the transmission function.

A transmission function can be approximated by a rectangular function, where the transmission function $f(\lambda)$ is then defined as:

$$f(\lambda) = \begin{cases} 0, & \text{if } \lambda > \lambda_0 + \delta\lambda^+ \\ 0, & \text{if } \lambda < \lambda_0 - \delta\lambda^- \\ 1, & \text{if } \lambda_0 - \delta\lambda^- \leq \lambda \leq \lambda_0 + \delta\lambda^+ \end{cases}.$$

In particular $|\lambda_0 + \delta\lambda^+| = |\lambda_0 - \delta\lambda^-|$ applies when the upper limit and the lower limit are arranged symmetrically around the mean $\lambda_0$, that is to say it is actually the central wavelength.

It should be noted at this point that the term "transmission function," as it is used in this document, is not to be equated with the technical specification for an interference filter, which is often also referred to as "transmission function." While the technical specification always means the transmission property of an interference filter under perpendicular light incidence and thus a constant material property, the term used here means a transmission function dependent on a variable optical path length. As a result, this also describes a quasi-rectangular function, but can, for example, be shifted to other frequencies due to different angles of incidence through the same interference filter or through different layer thicknesses of the interference filter. And it is precisely such a shift that the invention makes use of.

The increased spectral resolution is achieved in that the incoming scattered light signal—in other words, the incoming Raman scattered light—is imaged on the detection unit with a series of transmission functions that are minimally spectrally shifted relative to one another.

A "spectrally shifted transmission function" is understood to mean a transmission function that is assigned to a second optical path length $L_2 \neq L_1$ that is different from a first optical path length $L_1$ and defines a second spectral band $\delta\lambda_2$, whose mean wavelength $\lambda_{2,0}$ is shifted compared to the mean wavelength $\lambda_{1,0}$ of the first spectral band with the spectral width $\delta\lambda_1$. The spectral shift by the wavelength $\Delta\lambda_2$ is always given in relation to the first mean wavelength $\lambda_{1,0}$, the first mean wavelength $\lambda_{1,0}$ functioning as the reference wavelength. The following applies:

$$\Delta\lambda_2 = |\lambda_{2,0} - \lambda_{1,0}|.$$

The shift itself is also given with the unit "wavelength."

A "minimal" spectral shift of a transmission function by the wavelength $\Delta\lambda_2$ means that the spectral shift of the transmission function by the wavelength $\Delta\lambda_2$ is smaller and preferably very much smaller than the spectral width $\delta\lambda_2$ of the transmission function itself. The shift is preferably at least 0.1 nm. Furthermore, the shift is preferably a maximum of 2 nm, and the shift is particularly preferably less than 1 nm. The ratio of the spectral width $\delta\lambda_1$ and $\delta\lambda_2$ of each of the transmission functions to the spectral shift $\Delta\lambda_2$ is preferably at least 2 and particularly preferably at least 3 for reasons of resolution. Furthermore, for reasons of practicality, the ratio of the spectral width $\delta\lambda_1$ and $\delta\lambda_2$ of each of the transmission functions to the spectral shift $\Delta\lambda_2$ is preferably at most 10, more preferably not more than 6 and most preferably not more than 4.

While a first interference filter with a first thickness $d_1$ and/or consisting of layers with first refractive indices $n_{1,j}$ is used to generate the first filtered scattered light signal, a second interference filter, to be distinguished from the first interference filter, with a second thickness $d_2$ and/or consisting of layers with second refractive indices $n_{2,j}$ can be used to generate the second filtered scattered light signal. Alternatively, a path for the Raman scattered light through the first interference filter with the second optical path length $L_2 \neq L_1$ can be selected for generating the second filtered scattered light signal. For this purpose, for example, the angle of incidence $\alpha_2$ of the Raman scattered light on the first interference filter when generating the second filtered scattered light signal can be changed compared to the angle of incidence $\alpha_1$ when generating the first filtered scattered light signal. In other words, in order to generate the second filtered scattered light signal, the Raman scattered light strikes the surface of the first interference filter at a different angle of incidence $\alpha_2 \neq \alpha_1$ than when the first filtered scattered light signal is generated.

The two spectral bands $\delta\lambda_1$ and $\delta\lambda_2$, which are used in the generation of the scattered light signals and are minimally shifted from one another and defined by the transmission functions, partially overlap. The analysis of the totality of the filtered scattered signals then provides information about the Raman lines in the sample, which can normally only be obtained using high-resolution Raman devices. If the detected scattered light signals are offset against one another, this information can be extracted from the detected scattered light and put together to form a Raman spectrum. While a single filtered scattered light signal integrates the measured spectrum over the corresponding band $\delta\lambda_1$, the two or more signals provide support points that are less spaced apart than the bandwidth $\delta\lambda_1$ of the transmission functions from which the spectrum can be reconstructed with higher resolution. In particular, the positions of Raman peaks can be determined precisely in this way, even if these are narrower than the spectral bands of the transmission functions.

It is thus possible that a high-resolution Raman spectrum can be detected using components that are inexpensive in relation to expensive laboratory equipment, namely the at least one interference filter and the detection unit. Since only one or a few interference filters and a detection unit with a single or a few detector cells are required for the method, a corresponding detection device can be built in an easier to handle size, in particular transportable.

The method is not limited to generating a first and a second filtered scattered light signal. It can also include the generation of any number of further filtered scattered light signals, which are generated analogously to the second filtered scattered light signal. The method then further comprises the following step:

Generating further filtered scattered light signals by applying further transmission functions to the incoming scattered light signal, each of the further transmission functions being assigned to a further optical path length $L_i \neq L_1$ through the first interference filter or through a further interference filter, the further transmission functions each defining a further spectral band $\delta\lambda_i$, the further spectral bands Ski comprising light with further wavelengths around further mean wavelengths $\lambda_i$, the further mean wavelengths $\lambda_i$ being shifted by a wavelength $\Delta\lambda_i$ in relation to the first mean wavelength $\lambda_i$, the light of the further wavelengths passing through the first interference filter or one of the further interference filters.

When manufacturing interference filters on wafers with a diameter of ≥4", the thicknesses of the individual layers of the coating change from the center to the edge of the wafer due to technical limitations in production. As a result, it can happen that individual layers are thinner at the edge than in the middle of the wafer, which leads to a shift in the mean wavelength $\lambda_0$. This effect, which is actually deemed a production error, can be used according to the invention in that the wafer is divided into sections, each section having its own mean wavelength $\lambda_0$. Interference filters which are formed from such sections allow the transmission of the spectral ranges of the Raman scattered light that are slightly shifted relative to one another, given the same position in space, due to the different mean wavelengths $\lambda_0$ and the same spectral width. This effect can lead to a shift in the transmission function of an interference filter by up to 10 mm.

A large-area wafer can be mapped with comparatively little effort in terms of the spectral shift and separated to the required size. In this way, a filter kit can be created for an approximately 12-nm-wide spectral range (2 nm spectral width+10 nm shift). A filter kit assembled in this way comprises the first, the second and further interference filters, the transmission functions of the second or the further interference filters being shifted by the wavelengths $\Delta\lambda_2$ and $\Delta\lambda_i$ relative to the first mean wavelength $\lambda_1$.

A production error can therefore advantageously be used for the claimed method, in that interference filters with different optical path lengths $L_i$ are produced in a single production process. This makes the components required for the process cheaper.

Advantageously, the construction of a device for carrying out the method can also be simplified by using further interference filters. No moving parts are required, for example, for a pivoting movement to change the angle of incidence α. Furthermore, the detection unit can be designed as a single detector cell, which further reduces costs.

In one embodiment, the method also comprises the following steps:

Generation of a reference light signal;
Generating a first filtered reference light signal by applying the first transmission function to the reference light signal, the filtered reference light signal being assigned to the first filtered scattered light signal;
Generating a second filtered reference light signal by applying the second transmission function to the reference light signal, the second filtered reference light signal being assigned to the second filtered scattered light signal;
Detection of the first and second filtered reference light signal by the detection unit;
Generating corrected filtered scattered light signals by subtracting the filtered reference light signals from the respectively assigned filtered scattered light signals.

The subtraction of the filtered reference light signals from the respective filtered scattered light signals has the advantageous effect that errors in the signals detected by the detection unit can be reduced. In particular, errors inherent in the system, in particular errors due to optical impurity of the components used or adjustment errors, can be reduced by the correction. The reference light signal is generated by the same excitation light as the measurement signal, which passes through the device on the same path and, if available, with the same carrier (air, water, microscope carrier, container, etc.) but without the substance being sought.

In a further embodiment, a Raman spectrum is generated from the detected scattered light signals or from the corrected scattered light signals. The Raman spectrum can comprise one or more peaks, each peak being assigned a peak height and a peak position in the Raman spectrum. At least one material is assigned to each peak position in the Raman spectrum. The peak height includes information about the amount of material assigned to the peak position in the sample. If the Raman spectrum does not include any peaks, no materials can be detected in the sample whose Raman lines lie in the spectrum examined.

The intensity of the Raman scattered light is proportional to the number of scattering molecules in the sample. The following applies:

$$I \sim v^4 I_0 N \left(\frac{\partial a}{\partial q}\right)^2,$$

where l is the intensity of the Raman scattered light, v the frequency of the exciting laser, $I_0$ the intensity of the exciting laser, N the number of scattering molecules and $$\frac{\partial a}{\partial q}$$

the polarizability change.

In a further embodiment, a multivariate data analysis, in particular chemometrics, is used to generate the Raman spectrum.

Multivariate data analyzes are methods in which several variables are examined at the same time. The variables can be weighted differently, although the weighting of the individual variables is not necessarily known. Multivariate data analyzes include processes such as structure-discovering processes, in particular factor analysis, cluster analysis or multidimensional scaling or structure-checking processes, in particular variance analysis, artificial neural networks, discriminant analysis and conjoint analysis.

Chemometrics or chemometric methods are methods based on a multivariate data analysis with which a maximum f chemical information can be extracted from experimental measurement data. Spectra of material mixtures in near-infrared, visual or UV spectroscopy can usually only be evaluated using chemometric methods. Examples of such methods include principal component analysis, cluster analysis, and multiple linear regression.

The spectral resolution can advantageously be increased by using chemometric methods. The spectral width of the peaks in the Raman spectrum can thus be significantly smaller than the width of the spectral bands $\delta\lambda$ of the applied transmission functions.

With higher-resolution peaks, the accuracy of the determination of materials or material mixtures and their quantity in the sample can be increased, so that such a determination can also be carried out on samples in the flow. In the same way, chemometric methods can contribute to the resolution of an overall spectrum formed from minimally shifted and superimposed (partial) spectra. In this case, the shift between the spectra helps to achieve a higher resolution of the overall spectrum to be determined. In environmental technology in particular, the results can be applied to environmentally relevant material mixtures, whereby, for example, the pollution of a body of water with microparticles, in particular microplastics, can be determined and contributions from organic and inorganic particles can be differentiated.

In one embodiment, the incoming scattered light signal has a propagation direction, the method comprising a pivoting of the first interference filter relative to the propagation direction of the incoming scattered light signal between the generation of the first filtered scattered light signal and the generation of the second filtered scattered light signal, the pivoting of the first interference filter causing a change in the first optical path length $L_1$ to the second optical path length $L_2$.

As already explained above, the shift of the second transmission function with respect to the first transmission function by the wavelength $\Delta\lambda$ depends on the difference between the second optical path length $L_2$ and the first optical path length $L_1$. If the first interference filter is pivoted relative to the direction of propagation of the incoming scattered light signal, the angle of incidence $\alpha$ of the Raman scattered light changes from a first angle of incidence $\alpha_1$ to a second angle of incidence $\alpha_2$. This also changes the optical path length L from the first optical path length $L_1$ to the second optical path length $L_2$. The angle of incidence $\alpha$ can therefore be changed by pivoting the first interference filter by an angle $\varepsilon$ relative to the direction of propagation of the incoming scattered light signal. The wavelength $\Delta\lambda$ of the spectral shift can be estimated as follows:

$$\Delta\lambda_2 = |\lambda_2 - \lambda_1|$$

$$\text{with}: \lambda_2 \approx \lambda_1 \sqrt{1 - \frac{\sin^2\varepsilon}{n_1^2}},$$

The angle $\varepsilon$ can be set continuously or in interval steps for generating the second or the further filtered scattered light signals. Steps of 0.1°, 0.5°, 1° or >1° can be selected as interval steps, without being restricted thereto.

For generating the second filtered scattered light signal or the further filtered scattered light signals, the angle $\varepsilon$ can be set, for example, in a range from 0.1° to 20° and preferably from 0.1° to 15°. It should be noted that the angles describes a change in the position of the first interference filter from a first position to a second position. The angles $\varepsilon$ for generating the second filtered scattered light signal and possibly the further filtered scattered light signals always relate to a first position of the first interference filter, which can also be referred to as the reference position.

This embodiment advantageously only requires the first interference filter, with which the second filtered scattered light signal and, if necessary, the further filtered scattered light signals can be generated. The filtered scattered light signals are generated one after the other at different angles $\varepsilon$, the first interference filter being pivoted to a corresponding position for each filtered scattered light signal. Furthermore, this embodiment only requires a single detector cell as a detection unit, onto which the entire filtered Raman scattered light is imaged, usually focused. This allows the number of components required for the method (and consequently, the costs) to be reduced.

An alternative embodiment of the method provides that the first interference filter is replaced by the second interference filter between the generation of the first filtered scattered light signal and the generation of the second filtered scattered light signal.

The second optical path length $L_2 \neq L_1$ through the second interference filter is brought about by a different thickness $d_2 \neq d_1$ than the first interference filter or by different refractive indices $n_{2,j} \neq n_{1,j}$ compared to the first interference filter or by a different thickness and different refractive indices. In this case as well, the device only requires a single detector cell as a detection unit, onto which the entire filtered scattered light signal or the Raman scattered light to be detected is imaged/focused, and thus a small number of required components.

Instead of an exchange, two or more interference filters for generating the first and the second and possibly further filtered scattered light signals can alternatively be positioned at different locations so that the differently filtered scattered light signals can be detected simultaneously. This requires several detection units assigned to the individual interference filters.

Another embodiment combines the features of both of the above embodiments. A plurality of pivotable interference filters each with different thicknesses d and/or coatings with different refractive indices $n_j$ are used here. In this way, the potential range of the spectral shifts can advantageously be increased. By using a plurality of pivotable interference filters, the number of possibilities for using differently spectrally shifted transmission functions or the scope of the detectable Raman spectrum can be increased.

The following example should clarify this: A first interference filter with the thickness $d_1$ and the refractive indices $n_{1,j}$ can be positioned by pivoting in such a way that transmission functions with spectral bands $\delta\lambda_{AB}$, which extend in total from the wavelength $\lambda_A$ to the wavelength $\lambda_B$, can be used. A second interference filter, for example with a different thickness $d_2 \neq d_1$ and/or different refractive indices $n_{2,j} \neq n_{1,j}$, can be positioned by pivoting in such a way that transmission functions with spectral bands $\delta\lambda_{CD}$, whose sums range from wavelength $\lambda_C$ to the wavelength $\lambda_D$, can be used. The entire spectral range that can be detected with these two interference filters thus includes the wavelengths between $\lambda_A$ and $\lambda_B$ and between $\lambda_C$ and $\lambda_D$.

Another alternative embodiment of the method provides that the incoming scattered light signal propagates divergently or convergently and the generation of the first filtered scattered light signal at a first angle $\alpha_1$ relative to a reference beam and the generation of the second filtered scattered light signal at a second angle $\alpha_2 \neq \alpha_1$ take place relative to the reference beam. The light of the first wavelengths and the light of the second wavelengths pass through the first interference filter.

The perpendicular to the entry surface of the first interference filter when generating the first filtered scattered light signal is preferably used as the reference beam.

For example, the angle of incidence $\alpha$, with which the Raman scattered light strikes the surface of the first interference filter, can be changed by a first converging lens that is positioned in front of the first interference filter. From an approximately parallel, for example collimated, Raman scattered light, the first converging lens generates a beam focus in front of, in or behind the interference filter, but not on the detector. The Raman scattered light can then be viewed as a sum of infinitesimally wide partial beams. Each of the partial beams strikes the first interference filter at an individual angle of incidence $\alpha_i$. The different angles of incidence $\alpha_i$ also result in different optical path lengths $L_i$ through the first interference filter for each partial beam. Correspondingly, a plurality of filtered scattered light signals are generated from the incoming scattered light signal using the first converging lens. The method then further comprises the following step before generating the first filtered scattered light signal:

Focusing the incoming scattered light signal using a first converging lens.

The angular range that can be covered with this embodiment depends on the optical properties, in particular the refractive index, of the first converging lens.

For this method, the detection unit comprises an array of several detector cells, the filtered scattered light signals being detected by the detector cells.

As an alternative to a converging lens, a diverging lens can also be considered, with which the incoming scattered light beam is fanned out.

In a further aspect, the invention relates to a device for detecting Raman scattered light, the device being designed to carry out the method described above, the device comprising:
a detection unit and
a first interference filter or a first and a second interference filter.

For the claimed device, interference filters come into consideration, the substrate of which is preferably made of glass, in particular quartz glass, for wavelengths in the ultraviolet, visible or infrared spectrum or especially for the infrared spectrum made of sapphire glass or germanium. The interference filters are preferably between 0.5 and 2 mm thick. The first and (possibly) the second interference filter have a spectral width of a few nanometers, in particular between 0.5 nm and 4 nm, preferably between 1.5 nm and 2 nm, more preferably a spectral width of 2 nm. The detection unit can be formed as any of the following without limitation: a detector unit with one or more detector cells, also called pixels; a photomultiplier tube (PMT), in particular a silicon photomultiplier; a charge coupled device (CCD); and an avalanche photodiode (APD), in particular a silicon APD or single photon avalanche diode (SPAD) or near-infrared diode, in particular one made of indium gallium arsenide.

The detection device can also be operated using a bias voltage, as a result of which the sensitivity can be increased.

In a further embodiment, the device comprises a first lens, the detection unit comprising an array of detector cells, the array being oriented relative to the first lens such that light can be imaged convergently or divergently onto the array by the first lens, the first interference filter being positioned between the first lens and the detection unit.

The first lens can be designed both as a converging lens and as a diverging lens.

The array can in particular be designed as a one-dimensional array of detector cells. Furthermore, the array is preferably positioned in such a way that the Raman scattered light or the partial beams illuminate the array as completely as possible.

The first lens focuses or defocuses the Raman scattered light in such a way that the Raman scattered light, as already described above, hits the first interference filter in partial beams, each partial beam striking the surface of the first interference filter at a different angle of incidence $\alpha_i$. As a result, a different transmission function is applied to each partial beam. The transmission functions are each shifted by the wavelength $\Delta \lambda_i$, corresponding to the angle $\alpha_1$, with respect to the first transmission function.

In a further embodiment, the first lens is designed as a cylindrical lens with a first cylinder axis, the device further comprising a second lens, the second lens being designed as a cylindrical converging lens with a second cylinder axis, the first and second cylinder axes being perpendicular and oriented to one another and the array being positioned along the focal line of the second lens.

The second cylindrical converging lens advantageously focuses the filtered scattered light signal on the detection unit, as a result of which the signal strength is increased.

The first lens can preferably also be designed as a cylindrical converging lens and positioned such that the focal line of the first lens lies in front of, on, in or behind the surface of the first interference filter.

This configuration of the first and second cylindrical converging lenses can advantageously increase the light yield of the scattered light by the detection unit.

The second lens is preferably positioned between the first interference filter and the array of detector cells.

In one embodiment, the first interference filter is pivotably mounted.

The pivoting of the first interference filter can either be fixed with the aid of a mounting frame (particularly a miniaturized one) or some other suitable device, or by periodic rotation about the pivot axis. A "tunable" interference filter is implemented through a periodic rotation.

This embodiment implements the variant of the method described above, in which the optical path length L is achieved by changing the angle of incidence $\alpha$ of the Raman scattered light. In this embodiment, only one detector cell is advantageously required as a detection unit, as a result of which the costs for the device can be reduced further. Furthermore, the individual detector cell can be provided with a larger detection area, which increases the signal strength.

In a further embodiment, the device can have a first converging lens, a second converging lens and a pivotable first interference filter according to the above-mentioned embodiments in combination.

In one embodiment, the first interference filter is designed to be exchangeable by the second interference filter and/or further interference filters.

In this embodiment, the spectral shift by the wavelength $\Delta\lambda_2$ or $\Delta\lambda_1$ is implemented by the second or the further interference filters.

The device can, for example, comprise a holder for the interference filters, with which the interference filters are successively brought into a position which enables the filtered scattered light signals to be generated. The holder can, for example, be designed as a magazine in which the interference filters are positioned one behind the other.

In an alternative embodiment, several interference filters, each with a detector cell, are arranged so that the first and second scattered light signals and, if necessary, the further filtered scattered light signals can be generated simultaneously.

Furthermore, the device can comprise a closed housing with an inlet transparent to the Raman scattered light in order to protect the optical components of the device from dust or damage.

In a further aspect, the invention relates to a system for detecting Raman scattered light, comprising a light source, in particular a laser source, a device for positioning a sample and an optical device, the optical device being designed to direct the light from the light source onto the sample, the system further comprising any of the devices described above.

BRIEF DESCRIPTION OF THE DRAWINGS

In the following, embodiments of the invention are described with reference to figures. The figures show the following.

DETAILED DESCRIPTION OF THE INVENTION

Figure 1:
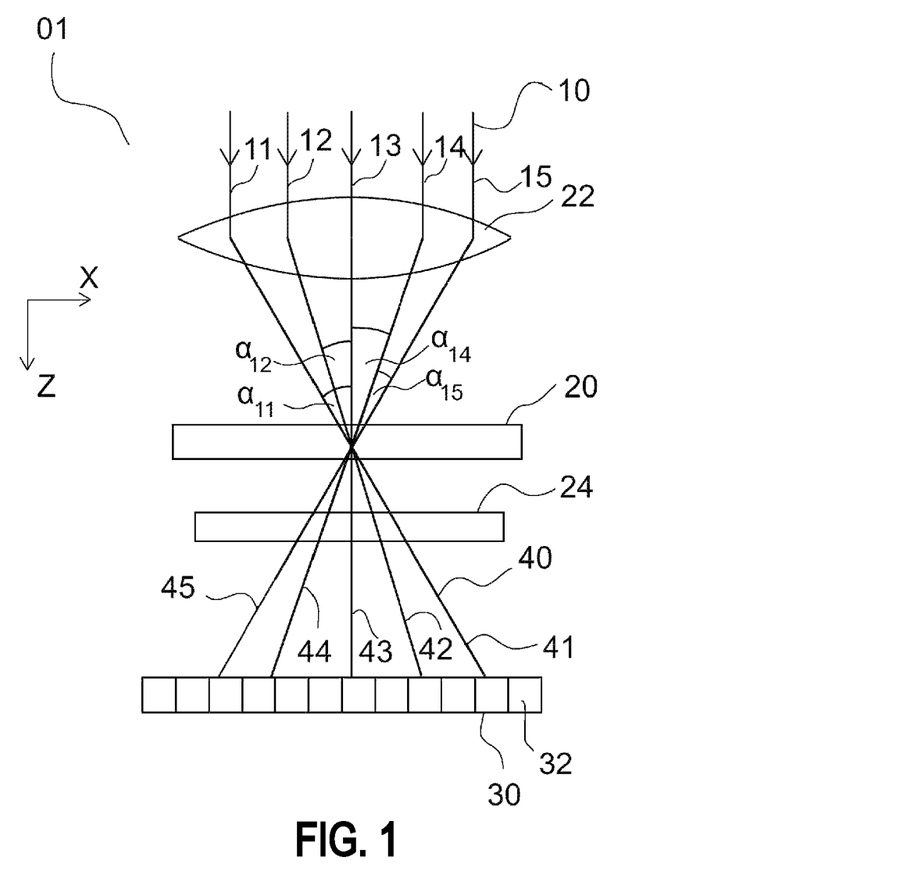
FIG. 1 shows a schematic representation of an embodiment with a first converging lens.

FIG. 1 shows an embodiment of the device 01. The device 01 comprises a first interference filter 20, a detection unit 30, and a first converging lens 22. The detection unit 30 comprises a plurality of detector cells 32 arranged next to one another in a row. Raman scattered light, including an incoming scattered light signal 10, strikes the first converging lens 22. The incoming scattered light signal 10 is composed of the incoming partial beams 11 to 15. The converging lens 22 refracts the incoming scattered light signal 10 and focuses the incoming scattered light signal 10. The focus of the first converging lens 22 lies here within the first interference filter 20.

The incoming partial beams 11 to 15 strike the surface of the first interference filter 20 at different angles of incidence $\alpha$. The central incoming partial beam 13 strikes the first interference filter 20 at an angle of incidence $\alpha_{13}=0°$ (not shown here) and is referred to here as the reference beam. The incoming partial beam 11 hits the first interference filter 20 at the angle of incidence $\alpha_{11}$. The incoming partial beam 12 hits the first interference filter 20 at the angle of incidence $\alpha_{12}$. The incoming partial beam 14 hits the first interference filter 20 at the angle of incidence $\alpha_{14}$. The incoming partial beam 15 hits the first interference filter 20 at the angle of incidence $\alpha_{15}$. The angles of incidence $\alpha_{11}$, $\alpha_{12}$, $\alpha_{14}$ and $\alpha_{15}$ are not equal to the angle of incidence $\alpha_{13}$ and therefore not equal to $0°$. In the following, the angles of incidence $\alpha_{11}$ to $\alpha_{15}$ differ from one another. In other words, the incoming scattered light signal 10 propagates convergently after the converging lens 22.

The incoming partial beams 11, 12, 13, 14 and 15 run through the first interference filter 20. Since they strike the first interference filter 20 at different angles of incidence $\alpha_{11}$ to $\alpha_{15}$, the incoming partial beams 11 to 15 pass the first interference filter 20 along different paths with the optical path lengths $L_{11}$, $L_{12}$, $L_{13}$, $L_{14}$ and $L_{15}$ (not shown here). The different optical path lengths $L_{11}$ to $L_{15}$ have the effect that a different transmission function is applied to each of the incoming partial beams 11 to 15. If, for example, the first transmission function is applied to the incoming partial beam 13 as a reference, the transmission functions that are applied to the incoming partial beams 11, 12, 14 and 15 are spectrally shifted by the wavelengths $\Delta\lambda_{11}$, $\Delta\lambda_{12}$, $\Delta\lambda_{14}$ and $\Delta\lambda_{15}$ compared to the first transmission function. By applying the transmission functions to the incoming partial beams 11 to 15, the filtered partial beams 41 to 45 are generated.

The filtered partial beam 41 is generated from the partial beam 11 at $\alpha_{11}\neq\alpha_{13}$ relative to the reference beam. The filtered partial beam 42 is generated from the partial beam 12 at the angle $\alpha_{12}\neq\alpha_{13}$ relative to the reference beam. The partial beam 43 is generated from the partial beam 13 as a reference beam. The filtered partial beam 44 is generated from the partial beam 14 at the angle $\alpha_{14}\neq\alpha_{13}$ relative to the reference beam. The filtered partial beam 45 is generated from the partial beam 15 at the angle $\alpha_{15}\neq\alpha_{13}$ relative to the reference beam. The filtered partial beams together form the filtered scattered light signal 40, the filtered partial beam 43 being detected as the first scattered light signal and the remaining, partially superimposed, filtered partial beams 41, 42, 44 and 45 being detected by the detection unit as further scattered light signals.

The filtered partial beams 41 to 45 strike the detection unit 30, which in this embodiment comprises a plurality of detector cells 32 arranged next to one another. The filtered partial beams 41 to 45 are detected by the detector cells 32. Using chemometric methods, a Raman spectrum of the measured sample can be created from the filtered scattered light signal 40, in particular from the filtered partial beams 41 to 45, after the detection.

In the embodiment shown here, an optional second converging lens is positioned between the first interference filter 20 and the detection unit 30. The converging lens is a cylindrical converging lens whose focal line lies on the detection unit 30 and which focuses the filtered partial beams 41-45 in a plane perpendicular to the image plane onto the detector cells 32 of the detection unit 30.

Figure 2:
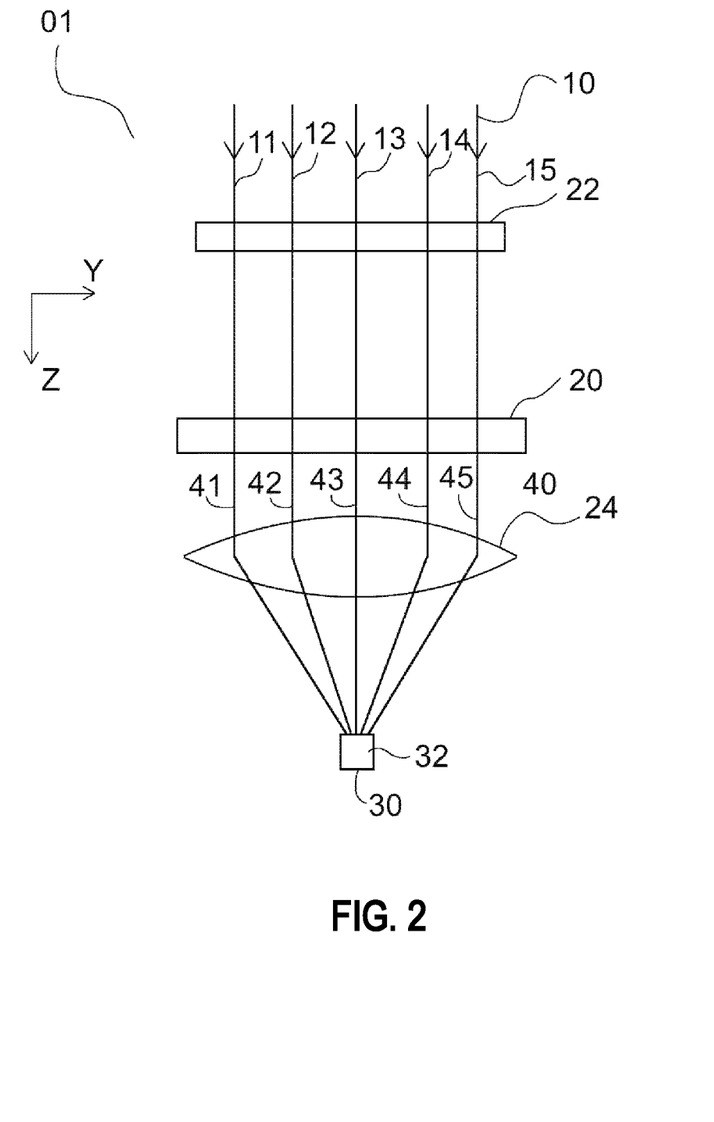
FIG. 2 shows a schematic representation of the embodiment from FIG. 1 from a different perspective.

A view of the embodiment from FIG. 1 rotated by 90° is shown in FIG. 2. The partial beams 11-15 run through the first converging lens 22 and the first interference filter 20 without being refracted in the image plane shown. The second converging lens 24 focuses the filtered partial beams 41-45 onto the detector cells 32 of the detector unit 30. The individual detector cells 32 are arranged one behind the other in this view.

Figure 3:
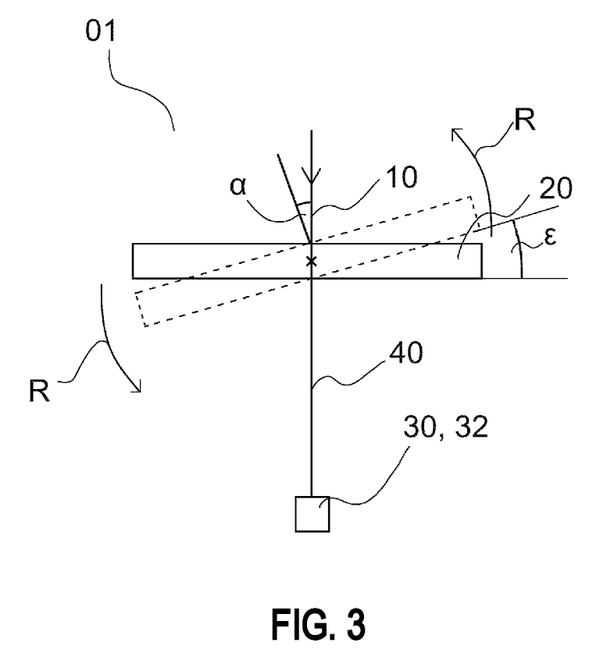
FIG. 3 shows a schematic representation of a further embodiment with a pivotable first interference filter.

FIG. 3 shows a further schematic illustration of an embodiment of the device 01. The device 01 comprises a detection unit 30 which is formed from a single detector cell 32. The device 01 further comprises a first interference filter 20. The first interference filter 20 is designed to be pivotable, the first interference filter 20 being pivotably mounted in the pivoting direction R. The position of the pivot axis and thus the specific design of the filter holder and the pivot mechanism are not important here. A first interference filter 20 pivoted by the angle α is shown with a dashed line.

If the incoming scattered light signal 10 hits the surface of the first interference filter 20, the wavelength Δλ of a spectral shift in the transmission function of the first interference filter 20 depends on the angle of incidence α between the direction of propagation of the incoming scattered light signal 10 and the perpendicular to the surface of the first interference filter 20. If the first interference filter 20 is pivoted about the pivot axis (here lying within the first interference filter 20) in the pivoting direction R, the angle of incidence α of the incoming scattered light signal on the first interference filter 20 changes. If the first interference filter is pivoted within the illustrated image plane, as indicated here by the dashed line, then the angle ε, by which the first interference filter is pivoted, is equal to the change in the angle of incidence α. This structure enables the use of different transmission functions, which are spectrally shifted relative to one another by the wavelength Δλ as a function of the angle ε.

The first interference filter 20 generates a filtered scattered light signal 40 from the incoming scattered light signal 10 by applying the transmission function which is dependent on the angle ε. The filtered scattered light signal 40 is detected by the detector cell 32 of the detection unit 30. In order to apply different transmission functions to the incoming scattered light signal 10, several measurements are carried out in this embodiment, each with different positions of the first interference filter 20, so that with each measurement the incoming scattered light signal 10 hits the first interference filter 20 at a different angle of incidence α.

Figure 4:
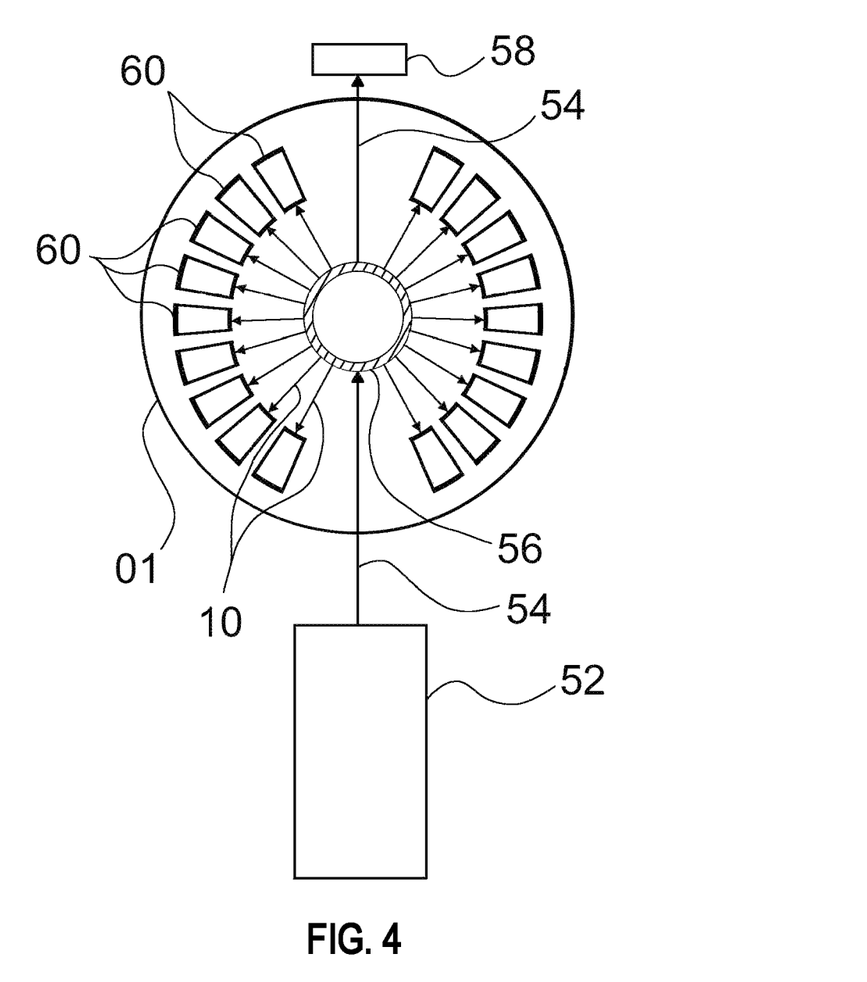
FIG. 4 shows a schematic representation of an embodiment with several detectors.

FIG. 4 shows a schematic representation of a further embodiment of the device 01 and how it is used for the detection of Raman scattered light. The device 01 is placed in the beam path of a laser beam 54, the laser beam 54 being generated by a laser source 52.

In the center of the device 01, a capillary 56 runs perpendicular to the image plane. A mixture, which comprises a sample to be examined, flows through the capillary 56 either into the image plane or out of the image plane. The wall of the capillary 56 that is transparent to the laser light is shown hatched in FIG. 4.

The laser beam 54 traverses the device 01, penetrating the capillary 56. The laser light of the laser beam 54 is at least partially scattered on the sample within the capillary 56 in all directions, as a result of which the not yet detected scattered light propagates as a scattered light signal 10 (to be detected and received) in all directions. A transmission detector 58, which detects and/or absorbs the non-scattered laser light, is positioned behind the device 01. The directions of propagation of the incoming scattered light signals 10 and of the laser beam 54 are indicated here by arrows.

The device further comprises a plurality of detectors 60 which are arranged in a circle around the capillary 56. The arrangement of the detectors 60 is interrupted in the areas of the beam path of the laser beam 54, so that the laser beam 54 is not blocked by the detectors 60 or the detectors 60 detect the unscattered laser light.

The detectors 60 each comprise at least one detection unit and at least one interference filter. The detectors 60 can optionally comprise one or more converging lenses. The detection units can furthermore each comprise one or more detection cells.

The detectors 60 differ from one another in that the interference filters filter different spectral ranges. The interference filters in the detectors 60 can, for example, be oriented differently to the respective direction of propagation of the incoming scattered signals 10, so that the incoming scattered light signals 10 hit the interference filters at different angles α. Alternatively or additionally, the interference filters can be coated with different thicknesses. In other words, the detectors 60 differ from one another by different optical path lengths L due to their interference filters.

The incoming scattered light signals 10 are detected as filtered scattered light signals by the detection units of the detectors 60 after they have been transmitted through the interference filters. Finally, a Raman spectrum can be generated from the detected scattered light signals.

With the embodiment of the device according to FIG. 4, several measurements can advantageously be carried out in parallel.

LIST OF REFERENCE SYMBOLS 01 device
10 incoming scattered light signal
11 incoming partial beam
12 incoming partial beam
13 incoming partial beam
14 incoming partial beam
15 incoming partial beam
20 first interference filter
22 first converging lens
24 second converging lens
30 detection unit
32 detector cell
40 filtered scattered light signal
41 filtered partial beam
42 filtered partial beam
43 filtered partial beam
44 filtered partial beam
45 filtered partial beam
52 laser source
54 laser beam
56 capillary
58 transmission detector
60 detector
R swivel direction
$\Delta\lambda_{1,2,i}$ wavelength of the spectral shift
$\lambda_{1,2,i}$ mean wavelength
$L_{1,2,i}$ optical path length
$\delta\lambda_{1,2,i}$ spectral band
α angle of incidence
ε angle

What is claimed is:

1. A method for detecting Raman scattered light using at least one interference filter and a detection unit, said Raman scattered light to be detected comprising an incoming scattered light signal,
wherein the method comprises the following steps:
generating a first filtered scattered light signal by applying a first transmission function to the incoming scattered light signal, the first transmission function being assigned to a first optical path length $L_1$ through a first interference filter, the first transmission function defining a first spectral band $\delta\lambda_1$, the first spectral band $\delta\lambda_1$ comprising light with first wavelengths around a first mean wavelength $\lambda_1$, the light of the first wavelengths being transmitted through the first interference filter,
generating second filtered scattered light signal by applying a second transmission function to the incoming scattered light signal, the second transmission function being assigned to a second optical path length $L_2 \neq L_1$ through the first interference filter or through a second interference filter, the second transmission function defining a second spectral band $\delta\lambda_2$, the second spectral band $\delta\lambda_2$ comprising light with second wavelengths around a second mean wavelength $\lambda_2$, the second mean wavelength $\lambda_2$ being shifted by a wavelength $\Delta\lambda_2$ compared to the first mean wavelength $\lambda_1$, wherein the shift by the wavelength $\Delta\lambda_2$ is smaller than a spectral width of the second spectral band $\delta\lambda_2$ itself, the light of the second wavelengths being transmitted through the first interference filter or through the second interference filter, and detecting the first and the second filtered scattered light signal with the detection unit.

2. The method according to claim 1, wherein the method further comprises the following steps:

generating a reference light signal, generating a first filtered reference light signal by applying the first transmission function to the reference light signal, the filtered reference light signal being assigned to the first filtered scattered light signal, generating a second filtered reference light signal by applying the second transmission function to the reference light signal, the second filtered reference light signal being assigned to the second filtered scattered light signal, detecting the first and second filtered reference light signal with the detection unit, and generating corrected filtered scattered light signals by subtracting the filtered reference light signals from the respectively assigned filtered scattered light signals.

3. The method according to claim 2, wherein a Raman spectrum is generated from the detected scattered light signals or from the corrected scattered light signals, and wherein a multivariate data analysis is used to generate the Raman spectrum.

4. The method according to claim 3, wherein the incoming scattered light signal has a direction of propagation, the method between the generation of the first filtered scattered light signal and the generation of the second filtered scattered light signal comprising a pivoting of the first interference filter relative to the direction of propagation of the incoming scattered light signal, the pivoting of the first interference filter causing a change from the first optical path length $L_1$ to the second optical path length $L_2$.

5. The method according to claim 3, wherein the first interference filter is replaced by the second interference filter between the generation of the first filtered scattered light signal and the generation of the second filtered scattered light signal.

6. The method according to claim 3, wherein the incoming scattered light signal propagates divergently or convergently and the generation of the first filtered scattered light signal at a first angle $\alpha_1$ relative to a reference beam and the generation of the second filtered scattered light signal takes place at a second angle $\alpha_2 \neq \alpha_1$ relative to the reference beam and the light of the first wavelengths and the light of the second wavelengths transmitted through the first interference filter.

7. The method according to claim 1, wherein a Raman spectrum is generated from the detected scattered light signals or from the corrected scattered light signals.

8. The method according to claim 7, wherein a multivariate data analysis is used to generate the Raman spectrum.

9. The method according to claim 1, wherein the incoming scattered light signal has a direction of propagation, the method between the generation of the first filtered scattered light signal and the generation of the second filtered scattered light signal comprising a pivoting of the first interference filter relative to the direction of propagation of the incoming scattered light signal, the pivoting of the first interference filter causing a change from the first optical path length $L_1$ to the second optical path length $L_2$.

10. The method according to claim 1, wherein the first interference filter is replaced by the second interference filter between the generation of the first filtered scattered light signal and the generation of the second filtered scattered light signal.

11. The method according to claim 1, wherein the incoming scattered light signal propagates divergently or convergently and the generation of the first filtered scattered light signal at a first angle $\alpha_1$ relative to a reference beam and the generation of the second filtered scattered light signal takes place at a second angle $\alpha_2 \neq \alpha_1$ relative to the reference beam and the light of the first wavelengths and the light of the second wavelengths transmitted through the first interference filter.

\* \* \* \* \*